United States Patent [19]

Caruso

[11] 4,026,043
[45] May 31, 1977

[54] ROLLERS WITH PLURAL DETENTS

[76] Inventor: Andrew Caruso, 104 Wyandanck Blvd., Commack, N.Y. 11725

[22] Filed: June 28, 1976

[21] Appl. No.: 700,725

[52] U.S. Cl. .................................. 35/77; 40/77.4; 235/131 FD
[51] Int. Cl.² .......................................... G09B 1/20
[58] Field of Search ............. 35/77, 27; 40/77.4, 40/114; 235/131 FD; 273/142 N, 143 R

[56] References Cited

UNITED STATES PATENTS

| 1,470,845 | 10/1923 | Johnson | 273/143 R |
| 1,781,055 | 11/1930 | Dudley | 40/77.4 |
| 2,476,580 | 7/1949 | Bergman | 35/77 |
| 3,784,197 | 1/1974 | Massicotte | 273/143 R |

FOREIGN PATENTS OR APPLICATIONS 957,539  5/1964  United Kingdom ............... 40/77.4

*Primary Examiner*—Harland S. Skogquist
*Attorney, Agent, or Firm*—Charles E. Temko

[57] ABSTRACT

A word forming device for use in teaching and related applications including a plurality of juxtaposed rotatable wheels, each having on a peripheral surface thereof the characters of the alphabet. The wheels rotate about a common axis and are provided with novel detent means permitting rows of characters to be aligned to form a word or words appearing beneath an elongated opening in a casing. The casing has a larger opening in a rearwardly facing surface thereof to permit manual manipulation of each of the wheels.

3 Claims, 5 Drawing Figures

U.S. Patent  May 31, 1977  4,026,043
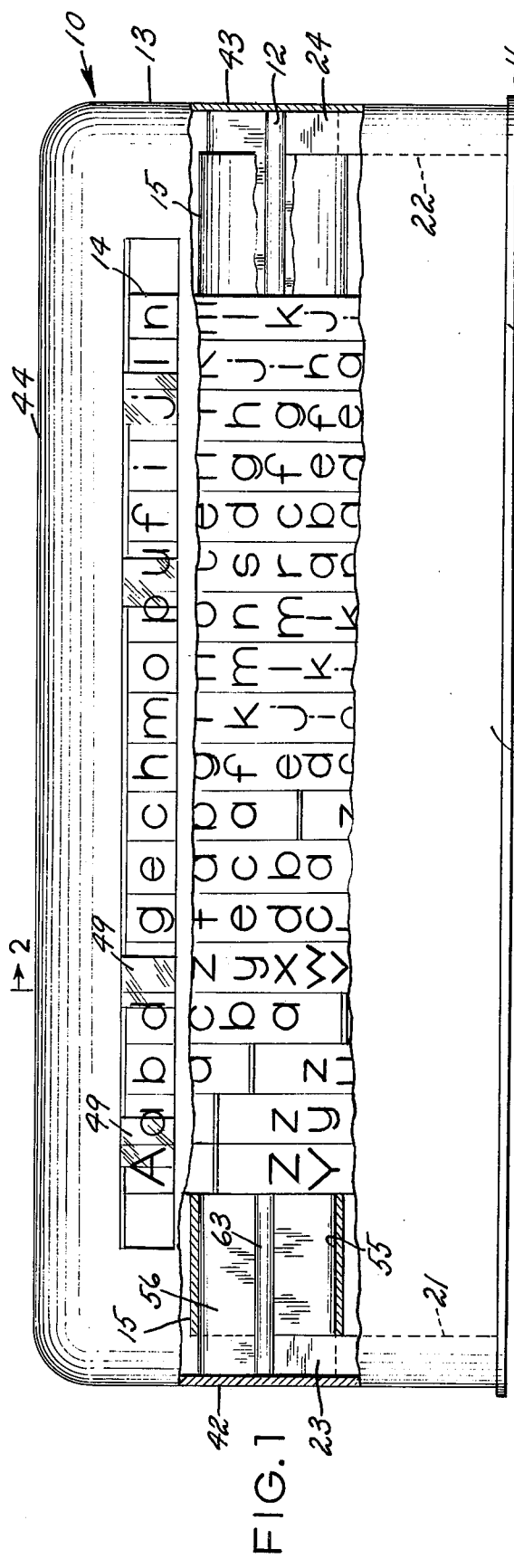
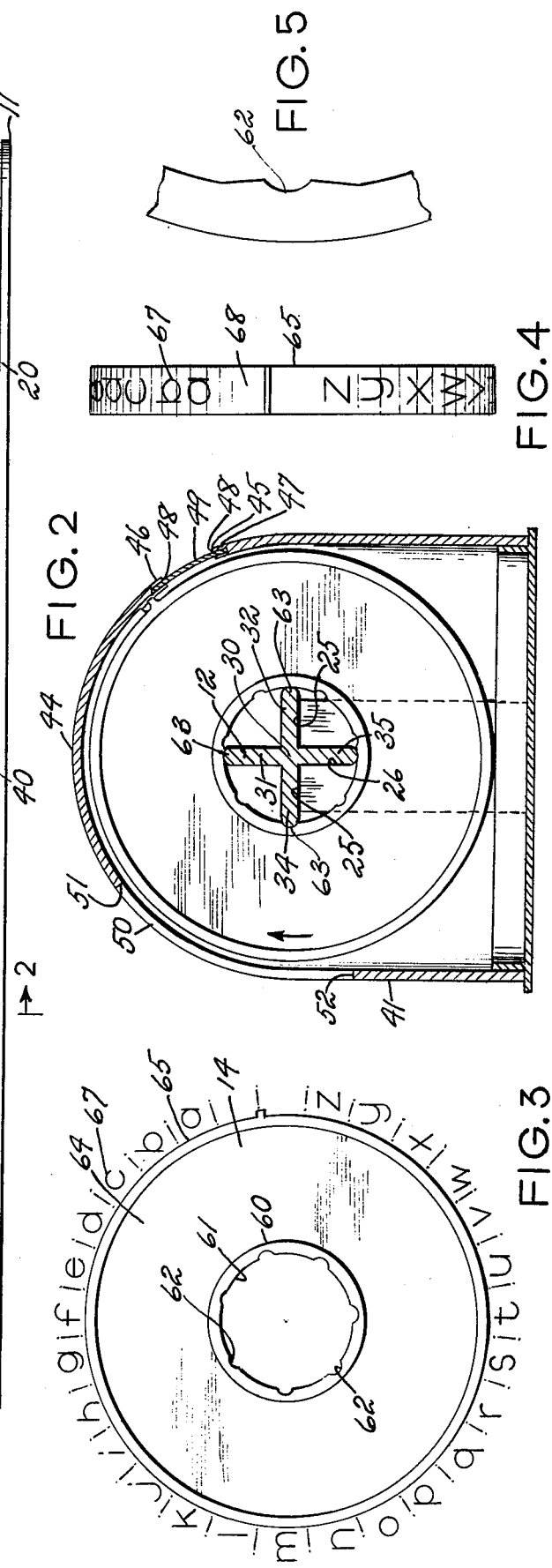

ROLLERS WITH PLURAL DETENTS

BACKGROUND OF THE INVENTION

This invention relates generally to the field of visual teaching devices, and more particularly to an improved word forming device in which a plurality of manually manipulable disc or wheels are moved to expose a line of alphabetical characters to form a word. Devices of this general type are well known in the art, and the invention lies in specific constructional details permitting ready position indexing of each character wheel relative to the others by manipulation of the user, and equally important, reasonably low cost of manufacture and assemblies.

One of the principal difficulties in using devices of this general type is that of adjusting one character-bearing wheel or disc, while maintaining the remaining discs or wheels relatively immobile. Particularly in the case of young users, the inability to maintain previously adjusted settings while completing the adjustment of the remaining discs or wheels greatly increases the amount of time necessary to form a word, with resultant frustration to users having relatively limited attention spans.

SUMMARY OF THE INVENTION

Briefly stated, the invention contemplates the provision of an improved device of the class described which includes a base element having a pair of upstanding trunnions at the end portions thereof supporting a horizontally positioned fixed axle upon which a plurality of character-bearing wheels are mounted for coaxial individual rotation. A cover element is supported by the base element, and encloses the wheels. The cover element includes an elongated horizontally-oriented opening which frames a formed word on a forwardly facing surface thereof, as well as a larger rearwardly facing opening allowing manual access to the exposed surfaces of the wheels for manual manipulation. The axle is of cruciform cross section. The bearing surfaces of each of the wheels rest upon end surfaces of the four planar members forming the cruciform cross section and are provided with seven evenly spaced recesses forming detents selectively engagable with the end surfaces of the planar members to be resiliently maintained against movement. Each wheel thus has 28 evenly spaced detent positions allowing for accommodation of the 26 letters of the alphabet and two blank portions.

BRIEF DESCRIPTION OF THE DRAWING

In the drawing, to which reference will be made in the specification, similar reference characters have been made to designate corresponding parts throughout the several views.

FIG. 1 is a front elevational view of an embodiment of the invention, partly broken away to show detail.

FIG. 2 is a vertical transverse sectional view as seen from the plane 2—2 in FIG. 1.

FIG. 3 is a view in elevation, somewhat schematic, of an individual character-bearing wheel forming a part of the embodiment.

FIG. 4 is an end elevational view of a character-bearing wheel.

FIG. 5 is an enlarged fragmentary view in elevation corresponding to the left central portion of FIG. 3.

DETAILED DESCRIPTION OF THE DISCLOSED EMBODIMENT

In accordance with the invention, the device, generally indicated by reference character 10, comprises broadly: a base element 11, an axle element 12, a cover element 13, a plurality of character-bearing wheels 14 and spacer members 15. All of the above mentioned components are preferably formed as synthetic resinous injection moldings, the axle element 12 and wheels 14 being formed from materials having a degree of resilience.

The base element 11 includes a bottom wall or floor member 20 of generally rectangular configuration. Extending upwardly from first and second end portions 21 and 22, respectively, are trunnion members 23 and 24, the upper edge surfaces 25 of which define notches 26 for engagement of the axle element 12 in fixed relation.

The axle element 12 may be either molded or formed as a continuous extrusion, and includes a central core 30 from which a plurality of planar members 31, 32, 33 and 34 radially extend. One of the members 31–34 is engaged within the notches 26 which engagement prevents rotation of the axle element about its own axis.

The cover element 13 is also generally rectangular in configuration, and includes a front wall 40, a rear wall 41, end walls 42 and 43 and a curved upper wall 44. A forwardly facing elongated opening 45 is bounded by upper and lower edges 46 and 47, respectively, having grooves 48 therein for the sliding retention of colored members 49 which may be used for the purpose of emphasizing individual letters in a word during a teaching exercise. A larger rear opening 50 is bounded by an upper edge 51 and a lower edge 52, and provides for manual access to the individual wheels 14 whereby they may be adjusted to desired angular position.

The spacer members 15 serve to maintain the wheels 14 on the axle element 12 generally centrally of the cover element 13, so that individual characters will be positioned beneath the opening 45 during operation. Each includes a cylindrical body 55 having a cruciform recess 56 engagable with the axle element in non-rotatable condition.

The wheels 14 are identical, each including a cylindrical hub 60 an inner surface 61 of which is provided with seven detent areas (see FIG. 5) selectively engagable with one end surface 63 of any of the planar members 31–34. There are thus twenty eight (seven multiplied by four) possible detent locations, or two more than the number of letters in the alphabet.

The hub 60 mounts a planar wall 64 supporting a cylindrical wall 65 on the periphery thereof, the outer surface of which supports representations of individual characters 67 (FIG. 4). These are positioned in regular order to leave a pair of blank spaces 68 useful where several words are being formed on a single line of characters.

It will be readily apparent that an obvious modification may be formed in which the cruciform cross section of the axle element is substituted by a triangular one, and the number of detent areas 62 is increased to 9. This construction permits 27 detented positions, which is useful where only a single blank area is desired. It is also possible to space the blank area between the m and n where two blank spaces are available, and it is desired to reduce the amount of rotation from any given position to display a blank space through the opening 45.

I wish it to be understood that I do not consider the invention limited to the precise details of structure shown and set forth in this specification, for obvious modifications will occur to those skilled in the art to which the invention pertains.

I claim:

1. An improved word forming device comprising: a base element having a lower wall member and a pair of trunnions extending upwardly therefrom, an axle element carried by said trunnions in fixed relationship thereto and having a cross section defining a plurality of free edge surfaces extending parallel to the axis of said axle element, a plurality of character-bearing wheels each having a hub defining a cylindrical recess rotatably positioned upon said axle element to engage said free edge surfaces thereof and defining plural detent recesses each selectively resiliently engagable with one of said elongated free edge surfaces; whereby said wheels may be rotated to be resiliently maintained against movement in any of a plurality of arcuate positions relative to said axle element; said wheels each having a peripheral surface defining juxtaposed locations at least equal in number to the number of possible detented positions obtained by the engagement of a detent recess with a free edge surface of said axle element, and individual alphabetic character positioned at the majority of said locations.

2. Structure in accordance with claim 1, including a cover element enclosing said wheels and supported from said base element, said cover element having an elongated opening therein for exposing an aligned row of characters on said wheels.

3. Structure in accordance with claim 1, further characterized in said axle element being of cruciform cross section and defining four free end edges, and said hub of said wheels defining seven detent recesses for the provision of 28 detentable positions.

* * * * *